United States Patent [19]

Zody et al.

[11] Patent Number: 4,870,167

[45] Date of Patent: Sep. 26, 1989

[54] HYDROPHOBICALLY MODIFIED NON-IONIC POLYGALACTOMANNAN ETHERS

[75] Inventors: George M. Zody; Michael E. Morgan, both of Louisville, Ky.

[73] Assignee: Hi-Tek Polymers, Inc., Louisville, Ky.

[21] Appl. No.: 20,876

[22] Filed: Mar. 2, 1987

[51] Int. Cl.$^4$ ............................................. C08B 37/00
[52] U.S. Cl. ..................................... 536/114; 536/120
[58] Field of Search .............................. 536/114, 120

[56] References Cited

U.S. PATENT DOCUMENTS

| | | | |
|---|---|---|---|
| 2,533,708 | 9/1950 | Moe | 536/114 |
| 3,483,121 | 12/1969 | Jordan | 252/8.551 |
| 4,011,393 | 3/1977 | Trapasso | 536/114 |
| 4,076,930 | 2/1978 | Ellingboe et al. | 536/120 |
| 4,129,722 | 12/1978 | Iovine et al. | 536/114 |
| 4,228,277 | 10/1980 | Landoll | 536/114 |
| 4,647,385 | 3/1987 | Williams et al. | 252/8.551 |

*Primary Examiner*—Ronald W. Griffin
*Attorney, Agent, or Firm*—Herbert P. Price

[57] ABSTRACT

Alkyl ethers of polygalactomannans wherein the alkyl groups contain 1 to 4 carbon atoms are further modified with long chain aliphatic epoxides wherein the long chains contain 8 to about 28 carbon atoms. The resulting derivatized polygalactomannans are particularly useful as thickening agents for aqueous systems.

12 Claims, No Drawings

HYDROPHOBICALLY MODIFIED NON-IONIC POLYGALACTOMANNAN ETHERS

BACKGROUND OF INVENTION

The field of art to which this invention pertains is polysaccharide derivatives.

Polygalactomannans and their derivatives are well known compositions which have many uses as thickening agents in aqueous systems.

The polygalactomannans are polysaccharides composed principally of galactose and mannose units and are usually found in the endosperm of leguminous seeds, such as guar, locust bean, honey locust, flame tree and the like. Guar gum, for example, is composed mostly of a galactomannan which essentially is a straight chain mannan with single membered galactose branches. The ratio of galctose to mannose in the guar polymer is 1:2.

Locust bean gum is a polygalactomannan gum of similar molecular structure in which the ratio of galactose to mannose is 1:4. Guar and locust bean gums are the preferred sources of the polygalactomannans, principally because of their commercial availability.

Hydroxyalkyl galactomannan gums are made by reacting the gums, such as guar gum and locust bean gum, with an alkylene oxide having at least two and, preferably, three or more carbon atoms as disclosed in U.S. Pat. No. 3,483,121. Galactomannan gums, as stated hereinabove, are composed of units of galactose and mannose sugars, each having an average of three reactive hydroxyl groups. These react with alkylene oxides to produce a hydroxyalkyl ether of the gum. Each unit of alkylene oxide added to the galactomannan gum in turn adds a new hydroxyl group which is itself reactive. Theoretically, there is no limit to the amount of alkylene oxide which may be added to the galactomannan gums. As a practical matter, however, a molecular substitution (M.S.) of about 4 to 5 is a practical upper limit.

Esters of hydroxyalkyl ethers of polygalactomannans are described in U.S. Pat. No. 2,523,708.

Mixed derivatives of polygalactomannans, i.e., carboxyalkyl hydroxyalkyl derivatives, are described in U.S. Pat. No. 3,723,409.

Modified nonionic cellulose ethers are disclosed in U.S. Pat. No. 4,228,277. The cellulose ethers described in this patent are nonionic cellulose ethers having a sufficient degree of nonionic substitution selected from the group consisting of methyl, hydroxyethyl and hydroxypropyl to cause them to be water-soluble and which then are further substituted with a hydrocarbon radical having about 10 to 24 carbon atoms in an amount between about 0.2 weight percent and the amount which renders said cellulose ethers less than 1 percent by weight soluble in water.

SUMMARY OF INVENTION

This invention pertains to polygalactomannans having both hydrophilic and hydrophobic substituents.

The compositions of this invention are poly(alkyl ethers) of polygalactomannans having at least two different alkyl ether substituents. One alkyl substituent is selected from the group consisting of R— and $HOR^1$— wherein R is an alkyl group containing one to four carbon atoms, wherein $R^1$ is an alkylene group containing two to four carbon atoms and wherein the OH group is on the carbon atom beta to the ether group.

The other alkyl substituent is selected from the group consisting of $R^2$, $HOR^3$, and

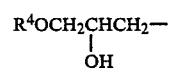

wherein $R^2$ is an alkyl group which contains about 8 to about 28 carbon atoms, wherein $R^3$ is an alkylene group which contains about 8 to about 28 carbon atoms having the OH group on the carbon atom beta to the ether group and wherein $R^4$ is an alkyl group containing about 5 to about 25 carbon atoms. The first alkyl ether substituent, i.e., R— and $HOR^1$—, is present in a M.S. of about 0.3 to about 1.5. The second alkyl ether substituent, i.e., $R^2$, $HOR^3$ and

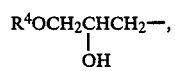

is present in a M.S. of about 0.001 to about 0.2 with the preferred M.S. being about 0.005 to about 0.10.

The compositions of this invention are efficient thickening agents for aqueous systems either alone or combined with a surfactant.

DESCRIPTION OF INVENTION

The alkyl ethers of polygalactomannans which are first formed in this invention are the methyl, ethyl, propyl, butyl hydroxyethyl, hydroxypropyl and hydroxybutyl ethers of the polygalactomannans. Such alkyl ethers can be prepared by dispersing a polygalactomannan as a powder in an organic solvent which is substantially inert and practically non-reacting under the reaction conditions with alkyl halides and alkylene oxides and further which is at least partially water miscible. The dispersed powder is then admixed with an aqueous alkali, such as an alkali metal hydroxide solution, and after a short time, a lower alkyl halide or alkylene oxide, e.g., methyl chloride, ethyl bromide, ethylene oxide, propylene oxide or butylene oxide, is added to the mixture. The reaction can be conducted as elevated temperatures and/or under pressure. When the reaction is completed, the hydroxyalkylated polygalactomannan is recovered by filtration.

Alkyl ethers of polygalactomannans can also be prepared by reacting guar splits with an alkyl halide or an alkylene oxide. Guar gum splits are obtained after the removal of the hulls and the germs from guar seeds. The guar gum splits are mixed with sufficient water and alkali to swell the splits but insufficient to form a gel. The alkyl halide or the alkylene oxide is then added and the reaction is carried out under agitation, usually in an apparatus such as a ribbon blender. When the reaction is complete, the guar reaction product, still in particulate form, is washed to remove excess alkali, or salt formed in the reaction. The hydroxyalkylated guar gum is then dried on a drum dryer to a moisture content of below 10 percent and is then flaked in a hammer mill.

The alkyl ethers of polygalactomannans useful in this invention have a M.S. (molecular substitution) of about 0.5 to about 1.5. The preferred composition for use in this invention is methyl guar, hydroxyethyl guar and hydroxypropyl guar with hydroxypropyl guar having an M.S. of 0.6 to 1.2 being most preferred.

The compositions of this invention are prepared by reacting the alkyl ethers of the polygalactomannan with a long aliphatic chain epoxy compound which contains from about 8 to about 28 carbon atoms or an alkyl halide having about 8 to about 28 carbon atoms in the alkyl group. Examples of such epoxy compounds are 1,2-epoxyoctane, 1,2-epoxydodecane, 1,2-epoxyhexadecane, 1,2-epoxytetracosane and the like. Other long chain epoxy compounds are glycidyl ethers of aliphatic alcohols wherein the aliphatic alcohols contain about 5 to about 25 carbon atoms. Examples of such glycidyl ethers are the glycidyl ethers of amyl alcohol, hexanol, octanol, lauryl alcohol, stearyl alcohol, lignoceryl alcohol and the like. Examples of useful alkyl halides are octyl chloride, decyl bromide, dodecyl iodine, hexadecyl bromide and the like.

The reaction of the long chain compounds with the alkyl ether of the polygalactomannan is conducted in a solvent under alkaline catalysis. The solvent must be one which swells and, preferably, does not dissolve the hydroxyalkyl ether and must be miscible with the long chain compound. By using such a solvent, the long chain compound can intimately contact the polygalactomannan so that the alkylation reaction can take place. The solvent must also be able to absorb some water, at least about 10 weight up to about 50 weight percent based on the weight of the total system, since the reaction is not conducted under completely anhydrous conditions. Examples of suitable solvents are methanol, ethanol, isopropanol, dimethyl formamide and bis(2-methoxyethyl)ether. The preferred solvents are methanol and isopropanol.

The alkaline catalysts used in this invention are sodium hydroxide and potassium hydroxide. Such catalyst are generally used as an alcoholic solution although they can be used in the solid state.

The reaction of the alkyl polygalactomannan and the long chain compound is conducted under substantially but not completely anhydrous conditions. The alkyl polygalactomannan used in this invention will contain about 5 to about 15 weight percent water based on the total weight of the polygalactomannan and water. The alkaline catalysts also may contain a small amount of water. It is preferred that the water content of the reaction be less than about 10 weight percent based on the total weight of solvent, catalyst and polygalactomannan.

In preparing the compositions of this invention, the alkaline catalyst is used in the amount of about 0.5 to about 5 weight percent based on the weight of the polygalactomannan and, preferably, in the amount of about 1 to about 3 percent. When alkyl halides are used as the alkylating agent, the alkaline catalyst is used in an amount equivalent to the halide in the alkyl halide and, preferably, in about 10 weight percent excess over the equivalent amount.

The amount of solvent used in preparing the composition of this invention will be that amount which allows the reactants to be stirred. Generally this amount will be an amount which is at least equal to the weight of the polygalactomannan, and preferably, at least about twice the weight of the polygalactomannan. From a theoretical standpoint there is no upper limit to the amount of solvent that can used. However, from a practical standpoint, usually no more than about 5 times the weight of the polygalactomannan is used.

The M.S. of the long chain derivative of this invention is about 0.001 to about 0.2 and, preferably, about 0.005 to about 0.10. These M.S. values are obtained by reacting the polygalactomannan with about 0.1 to about 10 weight percent of the long chain epoxy compound and, preferably, about 1 to about 5 weight percent.

The reaction for preparing the compositions of this invention is conducted by dispersing the alkylated polygalactomannan in the solvent followed by the addition of the long chain compound. The reaction vessel is purged with an inert gas before adding the alkaline catalyst. Sufficient time is allowed to let the polygalactomannan swell. Generally this time will be about 5 minutes to about 1 hour. The alkaline catalyst, usually dissolved in an alcohol, is then added and the reaction is conducted for a period of about 1 to about 5 hours. The reaction is conducted at room temperature up to about 80° C., and, preferably, at about 55° C. to about 75° C. When the reaction is completed, the product is recovered by filtration. It is washed to remove unreacted components, and is then filtered and dried.

Under the conditions in which the long chain alkylation reaction is conducted in this invention, underivatized polygalactomannans, i.e., guar gum or locust bean gum, do not react with the long chain alkyl halide or epoxy compound. In order for the reaction to take place, the polygalactomannan must first be alkylated with a short chain alkyl halide or alkylene oxide.

The viscosity of aqueous solutions of the compositions of this invention is enhanced by the addition of anionic or nonionic surfactants. The viscosity is increased by the addition of very small amounts of surfactant, i.e., 1 drop of surfactant in 400 mls of a 0.5 weight percent aqueous solution of the gum. Generally, about 10 ppm of surfactant up to about 1 percent by weight of surfactant are used based on the weight of the aqueous solution. Preferably, about 0.01 to about 0.2 percent by weight are used.

Any water soluble anionic or nonionic surfactant can be used in this invention. The preferred surfactants have an HLB of at least 7 and, more preferably, at least 10. Examples of suitable anionic surfactants are alkali metal, ammonium and amine soaps, such as sodium and potassium myristate, laurate, palmitate, oleate, stearate, resinate and hydroabietate, the alkali metal alkyl or alkylene sulfates, such as sodium lauryl sulfate, potassium stearyl sulfate, the alkali metal alkyl or alkylene sulfonates, such as sodium lauryl sulfate, potassium stearyl sulfate, the alkali metal alkyl or alkylene sulfonates, such as sodium lauryl sulfonate, potassium stearyl sulfonate, and sodium cetyl sulfonate, sulfonated mineral oil, as well as the ammonium salts thereof.

Other examples of suitable anionic surfactants are alkali metal salts of alkyl-aryl sulfonic acids, sodium dialkyl sulfosuccinate, sulfated or sulfonated oils, e.g., sulfated castor oil; sulfonated tallow and alkali salts of short chain petroleum sulfonic acids.

Examples of suitable nonionic surfactants are condensation products of higher fatty alcohols with ethylene oxide, such as the reaction product of oleyl alcohol with 10 ethylene oxide units; condensation products of alkyl phenols with ethylene oxide, such as the reaction products of isoctylphenol with 12 ethylene oxide units; condensation products of higher fatty acid amides with 5, or more, ethylene oxide units; polyethylene glycol esters of long chain fatty acids, such as tetraethylene glycol monopalmitate, hexaethyleneglycol monolaurate, nonaethyleneglycol monostearate, nonaethylneglycol dioleate, tridecaethyleneglycol monoarachidate, tricosaethylene glycol monobehenate, polyhydric tristearate, ethylene oxide condensation products of polyhydric alcohol partial higher fatty esters, and their inner anhydrides (mannitol-anhydride, called Mannitan, and sorbitol-anhydride called Sorbitan), and as glycerol monopalmitate reacted with 10 molecules of ethylene oxide, pentaerythritol monoleate reacted with 12 molecules of ethylene oxide, sorbitan monostearate reacted with 10 to 15 molecules of ethylene oxide; long chain polyglycols in which one hydroxyl group is esterified with a higher fatty acid and the other hydroxy group is etherified with a low molecular weight alcohol, such as methoxypolyethylene glycol 550 monostearate (550 meaning the average molecular weight of the polyglycol ether). A combination of two or more of these surfactants can be used.

The following examples will describe the invention in more detail. Parts and percentages are parts and percentages by weight unless otherwise designated.

EXAMPLE 1

To a suitable reactor were added 90 parts of hydroxypropyl guar having an M.S. of 1.2, 250 parts of isopropanol and 18 parts of 1,2-epoxyoctane. Agitation was begun and the reactor was purged with nitrogen gas. The temperature was raised to 60° C. and the temperature was held at 60° C. for ten minutes to allow the guar to swell. Potassium hydroxide, 2 parts dissolved in 5 parts of methanol, was added, and the temperature was held at 60° C. for 1.5 hours. The reactants were cooled to room temperature and the liquid was decanted from the solid derivatized guar. The derivatized guar was washed twice with acetone, was filtered and allowed to air dry.

EXAMPLE 2

Using the same procedure as described in Example 1, 90 parts of hydroxypropyl guar having an M.S. of 1.2 were reacted in 250 parts of isopropanol with 13.8 parts of 1,2-epoxydodecane using 2 parts of potassium hydroxide dissolved in 5 parts of methanol.

EXAMPLE 3

Using the same procedure as described in Example 1, 90 parts of hydroxypropyl guar having an M.S. of 1.2 were reacted with 18 parts of 1,2-epoxyhexadecane in 250 parts of isopropanol using 2 parts of potassium hydroxide in 5 parts of methanol.

EXAMPLE 4

Using the same procedure described in Example 3, 90 parts of hydroxypropyl guar having an M.S. of 1.2 were reacted with 20.1 parts of 1,2-epoxyoctadecane in 250 parts of isopropanol using 2 parts of potassium hydroxide dissolved in 5 parts of methanol.

EXAMPLE 5

Using the same procedure described in Example 1, 90 parts of hydroxypropyl guar having an M.S. of 1.2 were reacted with 28.5 parts of a $C_{24}$–$C_{28}$ alpha olefin oxide in 250 parts of isopropanol with 2 parts of potassium hydroxide dissolved in 5 parts of methanol.

EXAMPLE 6

Using the same procedure described in Example 1, 90 parts of 1.2 M.S. hydroxypropyl guar were reacted with 36 parts of 1,2-epoxyhexadecane in 250 parts of isopropanol using 2 parts of potassium hydroxide dissolved in 5 parts of methanol.

Half percent solutions of the derivatized guar from Examples 1–6 were made in deionized water. The pH of the solutions was adjusted to 6.7 with formic acid and the solutions were allowed to hydrate for 24 hours at 80° F. A 0.5 percent solution of 1.2 M.S. hydroxypropyl guar was made up and treated the same way as the control. The viscosity at 20 rpm using a Brookfield viscometer was determined on the solutions. 0.5 percent derivatized guar solutions were also made up in aqueous 2 percent potassium chloride solutions, and the viscosity determined in the same manner. A small quantity of 28 percent solution of ammonium lauryl sulfate in deionized water was added to 400 parts of the derivatized guar solution and the viscosity after the addition was determined. The Brookfield viscosity at 25° C. of the aqueous guar solutions are listed in Table I.

TABLE I

| Example | Aqueous Solution Viscosity cps | 2% KCl Solution Viscosity cps | mls ALS* | Viscosity cps |
|---|---|---|---|---|
| Control | 200 | 175 | 0.3 | No change |
| 1 | 150 | 140 | 1.6 | 800 |
| 2 | 150 | 145 | 0.3 | 4800 |
| 3 | 360 | 460 | 0.3 | 4900 |
| 4 | 370 | 480 | 0.3 | 5000 |
| 5 | 1366 | | | |
| 6 | 1520 | | | |

*Ammonium Lauryl Sulfate - 28 percent solution in water.

EXAMPLE 7

To a suitable reactor were added 90 parts of hydroxypropyl guar having an M.S. of 1.2, 250 parts of isopropanol and 18 parts of 1,2-epoxyhexadecane. Agitation was begun and the reaction vessel was purged with nitrogen gas. The temperature was then raised to 70° C. and the mixture was allowed to swell for 10 minutes. Two parts of potassium hydroxide dissolved in 5 parts of methanol were then added to the reaction vessel and the temperature was held at 70° C. for 1.5 hours. The derivatized guar product was recovered after washing with acetone and after air drying. The product was dissolved in deionized water to make a 0.5 percent solution and the pH was adjusted to 6.7 with formic acid. After two hours hydration at room temperature, the Brookfield viscosity was 1100 cps.

EXAMPLE 8

To a suitable reactor were added 90 parts of guar flour, 250 parts of isopropanol and 18 parts of 1,2-epoxyhexadecane. Agitation was begun and the reaction vessel was purged with nitrogen gas. The temperature was raised to 60° C. After about 10 minutes, 2 parts of potassium hydroxide in 5 parts of methanol were added and the reactants were held with stirring at 60° C. for 1.5 hours. The reaction mass was cooled to room temperature and was poured into 1000 parts of acetone. After 30 minutes, the mass was filtered and the recovered powder was spread on a tray to air dry.

The dried product was dissolved in deionized water to make a 0.5 percent solution. The viscosity was 380 cps at room temperature. To 400 parts of the solution was added 0.3 part of a 28 percent aqueous solution of ammonium lauryl sulfate. The viscosity after the addition was 360 cps. An additional 0.6 parts of the ammonium lauryl sulfate solution was added. The viscosity was found to be 340 cps.

The viscosity of an aqueous 0.5 percent guar flour solution before being reacted was 510 cps.

The compositions of this invention are useful in the manufacture of paper coatings and sizings, adhesives, such as wallpaper adhesive, liquid detergents, and in emulsions used to make polishes, cleaners and latices. The compositions can be used in compositions for textile printing and dyeing, and as textile binders and adhesives. Water borne coatings can be made using the composition of this invention. Such uses include their use as thickeners for latices, protective colloids and flow control agents. They can be used as suspending agents in agricultural sprays and as suspending agents for pigments and inks. They find use in the photographic processing and in the manufacture of ceramics. Another field of use is cosmetics wherein they can be used in the manufacture of hand lotions, shampoos, hair treatment compounds, toothpaste and gels used for teeth cleaning, as well as make-up. They find use in the general fields of mining, explosives and oil stimulation. Examples of oil stimulation uses are drilling fluids, reservoir flooding, well completion and workover agents, fracturing fluids and fluid loss control agents.

The principles, preferred embodiments and modes of operation of the present invention have been described in the foregoing specification. The invention which is intended to be protected herein, however, is not to be construed as limited to the particular forms disclosed, since these are to be regarded as illustrating rather than restrictive. Variations and changes may be made by those skilled in the art without departing from the spirit of the invention.

What is claimed is:

1. As a composition of matter, a poly(alkyl ether) of a polygalactomannan having at least two different alkyl ether substituents wherein one alkyl ether substituent is selected from the group consisting of R and $HOR^1$, wherein R is an alkyl group containing one to four carbon atoms, wherein $R^1$ is an alkylene group containing two to four carbon atoms and wherein the OH group is on the carbon atom beta to the ether group, wherein the other alkyl substituent is selected from the group consisting of $R^2$, $HOR^3$ and $$R^4OCH_2\underset{\underset{OH}{|}}{C}HCH_2,$$

wherein $R^2$ is an alkyl group containing about eight to about twenty eight carbon atoms, wherein $R^3$ is an alkylene group which contains about 8 to about 28 carbon atoms having the OH group on the carbon atom beta to the ether group and wherein $R^4$ is an alkyl group containing about 5 to about 25 carbon atoms, wherein the substituent, R or $HOR^1$, is present in a M.S. of about 0.3 to about 1.5 and wherein the substituent, $R^2$, $HOR^3$, or $$R^4OCH_2\underset{\underset{OH}{|}}{C}HCH_2,$$

is present in a M.S. of about 0.001 to about 0.2.

2. The composition of claim 1 wherein the polygalactomannan is guar gum.
3. The composition of claim 1 wherein the polygalactomannan is locust bean gum.
4. The composition of claim 1 wherein R is methyl.
5. The composition of claim 1, wherein $HOR^1$ is hydroxpropyl.
6. The composition of claim 1 wherein $HOR^3$ is hydroxyoctyl.
7. The composition of claim 1 wherein $HOR^3$ is hydroxydodecyl.
8. The composition of claim 1 wherein $HOR^3$ is hydroxyhexyldecyl.
9. The composition of claim 1 wherein $HOR^3$ is hydroxyoctadecyl.
10. The composition of claim 1 wherein the M.S. of the substituents R or $HOR^1$ is about 0.6 to about 1.2.
11. The composition of claim 1 wherein the M.S. of the substituent, $R^2$, $HOR^3$, or $$R^4OCH_2\underset{\underset{OH}{|}}{C}HCH_2,$$

is about 0.005 to about 0.10.

12. As a composition of matter, a hydroxypropyl, hydroxydecyl ether of guar gum, wherein the hydroxypropyl group is present in a M.S. of about 0.5 to about 1.5 and the hydroxydecyl group is present in a M.S. of about 0.001 to about 0.2.

* * * * *